US005926523A

United States Patent [19]
Choi

[11] Patent Number: 5,926,523
[45] Date of Patent: Jul. 20, 1999

[54] APPARATUS AND METHOD OF RECOGNIZING ESTABLISHMENT OF SPEECH CHANNELS IN COMMUNICATION APPLIANCES CONNECTED IN PARALLEL TO A COMMON TELEPHONE LINE

[75] Inventor: Seung-Young Choi, Kyungki-do, Rep. of Korea

[73] Assignee: SamSung Electronics Co., Ltd., Suwon, Rep. of Korea

[21] Appl. No.: 08/864,273

[22] Filed: May 27, 1997

[30] Foreign Application Priority Data

May 27, 1996 [KR] Rep. of Korea .................... 96 18010

[51] Int. Cl.⁶ ........................................... H04M 3/20
[52] U.S. Cl. .............................. 379/79; 379/350
[58] Field of Search .......................... 379/67.1, 70, 79, 379/82, 90.01, 100.15, 164, 350, 372, 377

[56] References Cited

U.S. PATENT DOCUMENTS

| | | |
|---|---|---|
| 4,169,217 | 9/1979 | Szanto et al. . |
| 4,451,707 | 5/1984 | Hanscom et al. . |
| 4,660,218 | 4/1987 | Hashimoto . |
| 4,852,153 | 7/1989 | Streck . |
| 4,868,865 | 9/1989 | Ogawa et al. . |
| 4,908,851 | 3/1990 | Kotani et al. . |
| 4,995,073 | 2/1991 | Okata et al. . |
| 5,018,189 | 5/1991 | Kurosawa et al. . |
| 5,065,427 | 11/1991 | Godbole . |
| 5,086,455 | 2/1992 | Satomi et al. . |
| 5,111,502 | 5/1992 | McClure et al. ........................ 379/184 |
| 5,131,026 | 7/1992 | Park . |
| 5,255,311 | 10/1993 | Yoshida . |
| 5,333,179 | 7/1994 | Yamamoto et al. . |
| 5,414,764 | 5/1995 | Watanabe et al. ........................ 379/377 |
| 5,422,939 | 6/1995 | Kramer et al. . |
| 5,428,673 | 6/1995 | Nakagawa et al. . |
| 5,444,770 | 8/1995 | Davis et al. . |
| 5,487,105 | 1/1996 | Sakai . |
| 5,521,974 | 5/1996 | Hayashi et al. . |
| 5,526,420 | 6/1996 | Watanabe et al. . |
| 5,727,056 | 3/1998 | Lee ........................................ 379/399 |
| 5,796,789 | 8/1998 | Eftechiou .................................. 379/35 |

Primary Examiner—Scott Weaver
Attorney, Agent, or Firm—Robert E. Bushnell, Esq.

[57] ABSTRACT

An apparatus for recognizing an establishment of speech channel in communication appliances connected in parallel to a common telephone line includes a hook switching unit for establishing a speech channel between the telephone line and a selected one of the communication appliances in accordance with a switch-on control signal, and for cutting off the established speech channel in accordance with a switch-off control signal; a detecting unit, connected to the telephone line and adapted to detect a loop current from the telephone line; a storage unit for storing a value of the loop current detected from the detecting unit as a one-channel value when the speech channel is initially established between the telephone line and the selected one of the communication appliances, and a control unit for generating the switch-on control signal to the hook switching unit in response to an incoming call, and for generating the switch-off control signal to the hook switching unit for switching a call conversation to another communication appliance connected in parallel to the telephone line when the value of the loop current output from the detecting unit is lower than the one-channel value while the selected one of the communication appliances is playing back a recorded message to the telephone line in an automatic telephone answering mode.

10 Claims, 2 Drawing Sheets

APPARATUS AND METHOD OF RECOGNIZING ESTABLISHMENT OF SPEECH CHANNELS IN COMMUNICATION APPLIANCES CONNECTED IN PARALLEL TO A COMMON TELEPHONE LINE

CLAIM FOR PRIORITY

This application makes reference to, incorporates the same herein, and claims all benefits accruing under 35 U.S.C. §119 from an application for APPARATUS AND METHOD OF RECOGNIZING ESTABLISHMENT OF SPEECH CHANNELS IN COMMUNICATION APPLIANCES earlier filed in the Korean Industrial Property Office on May 27, 1996, and there duty assigned Ser. No. 18010/1996.

BACKGROUND OF THE INVENTION

1. Technical Field

The present invention relates to communication systems, and more particularly, relates to an apparatus for allowing a communication appliance which is connected in parallel to a single telephone line along with other communication appliances and initially establishes a speech channel to recognize an establishment of another speech channel at the site of other standby communication appliances.

2. Related Art

Many communication appliances such as answering machines, facsimile machines, modem and the like, share a single telephone line with a subscriber's telephone set. These communication appliances may be independently connected in parallel to the subscriber's telephone set to share the common telephone line, or may be integrated in a single multi-function system connected to the common telephone line for performing multiple functions of, for example, telephone, copier, printer, facsimile machine, scanner and answering machine. Examples of such contemporary communication appliances are disclosed in U.S. Pat. No. 4,660,218 for Apparatus For Switching Telephone Line A Response Device, A Data Terminal Or A Telephone issued to Hashimoto, U.S. Pat. No. 4,852,153 for Single Line Master Telephone With Fax Connection issued to Streck, U.S. Pat. No. 4,868,865 for Terminal Switching Control Apparatus issued to Ogawa et al., U.S. Pat. No. 4,908,851 for Facsimile Apparatus Operable In Facsimile Or Conversation Mode issued to Kotani et al., U.S. Pat. No. 4,995,073 for Communication Apparatus And Communication System Having Automatic Attribution Switching issued to Okata et al., U.S. Pat. No. 5,018,189 for Communication Apparatus With Telephone And Data Communication Capability issued to Kurosawa et al., U.S. Pat. No. 5,065,427 for Fax/Data Call Receiving System And Method issued to Godbole, U.S. Pat. No. 5,086,455 for Facsimile Arrangement Having Automatic Answering Telephone Set And Facsimile Set And Switching Process Therefor issued to Satomi, U.S. Pat. No. 5,131,026 for Facsimile System Having Auto-Answering Function issued to Park, U.S. Pat. No. 5,255,311 for Data Communication Apparatus issued to Yoshida, U.S. Pat. No. 5,260,991 for Facsimile Apparatus issued to Ikegaya, U.S. Pat. No. 5,323,451 for Facsimile Device And Automatic Receiving Method issued to Yatsunami, U.S. Pat. No. 5,333,179 for Facsimile Apparatus With Automatic Answering Telephone Function issued to Yamamoto et al., U.S. Pat. No. 5,337,349 for Image Telecommunication Apparatus issued to Furohashi, U.S. Pat. No. 5,428,673 for Data Communication Apparatus Having The Function Of Automatically Switching Data Communication And Telephone Communication issued to Nakagawa et al., U.S. Pat. No. 5,444,770 for Telephone Handset Interface For Automatic Switching Between Voice And Data Communications issued to Davis et al., and U.S. Pat. No. 5,487,105 for Facsimile Apparatus Operable In Facsimile Or Telephone Mode issued to Sakai.

Generally, conventional communication appliances allow the subscriber to establish voice or telephone communication as well as data communication over a single telephone line. Priority is usually given to use of the telephone line by the telephone set. When telephones and a facsimile machine are connected to a single telephone line, however, the facsimile machine may establish a speech channel earlier than the other communication appliances, namely, the telephones, in responses to a ring signal sent from a public telephone network. In such an arrangement, the facsimile machine and the telephone answering machine are generally set in an automatic telephone answer mode in order to receive both fax and voice messages when the subscriber is absent. When the facsimile system is set in the automatic telephone answer mode, and a call comes in, the telephone answering machine answers and plays the recorded announcement. If the call is from a person, the calling subscriber can leave a message following the normal instructional procedure for the answering machine. If the call is from another facsimile system however, the facsimile system switches over to an automatic reception mode for automatically receiving the document. When the recorded message from the facsimile machine is being transmitted to the calling subscriber, however, the use of the telephone line by the facsimile machine is retained until the transfer of the recorded message is completed even if the subscriber picks up the telephone handset to use the telephone. The facsimile machine cannot recognize an establishment of the speech channel at the telephone site and continuously transfer the recorded message to the telephone line. As a result, the originating communication site receives only the recorded message and may not execute the desired communication service. Accordingly, it is desirable for the facsimile machine to recognize the establishment of the speech channel at the telephone site in order to effectively switch the right of call conversation to the telephone site without having to continue playing back a recorded message to the common telephone line.

Recent efforts to detect a pick-up of a telephone connected in parallel to the facsimile system are disclosed, for example, in U.S. Pat. No. 5,414,764 for Communication Apparatus issued to Watanabe et al., U.S. Pat. No. 5,422,939 for Parallel Off-Hook Detection For Both Line Available And Phone Pick-Up Detection issued to Kramer et al., U.S. Pat. No. 5,526,420 for Communication Apparatus issued to Watanabe et al. For example, Watanabe et al. '764 and '420 disclose pick-up detection circuits for recognizing pick-up of telephone handset during use of the telephone line by a secondary device such as a facsimile machine by sensing changes in the impedance appearing across the subscriber premises end of the telephone line. Similarly, Kramer et al. '939 discloses a parallel off-hook detection circuit for detecting parallel pick-up of telephone handset during use of the telephone line by the secondary device in order to control the secondary device to terminate its use of the common telephone line and thereby make the telephone line available for use by the primary telephone device. While these parallel pick-up detection circuits of Watanabe et al. '764 and '420 and Kramer et al. '939 contain their own merits, they tend to be rather complex, and are not particular concerned with a situation when a subscriber picks up the telephone pick-up handset in an attempt to answer the incoming call while the facsimile system is playing back a recorded announcement via the common telephone line.

SUMMARY OF THE INVENTION

Accordingly, it is therefore an object of the present invention to provide an apparatus and process of allowing a selected communication appliance from a plurality of communication appliances connected in parallel to a single telephone line to recognize an establishment of a speech channel at the site of the other communication appliances.

It is also an object to provide an apparatus and process of allowing a communication appliance, which is connected in parallel to a single telephone line along with other communication appliances and initially establishes a speech channel, to continuously monitor the establishment of another speech channel at the site of the other standby communication appliances.

It is another object to provide an apparatus and process of allowing a communication appliance, which is connected in parallel to a single telephone line along with other communication appliances and initially establishes a speech channel, to recognize the establishment of another speech channel at the site of the other communication appliances while automatically transferring an outgoing message, and to switch the call conversation to the other communication appliance site in accordance with the speech channel recognition.

These and other objects of the present invention can be achieved by an apparatus for recognizing an establishment of speech channel in communication appliances connected in parallel to a common telephone line which includes a hook switching unit for establishing a speech channel between the telephone line and a selected one of the communication appliances in accordance with a switch-on control signal, and for cutting off the established speech channel in accordance with a switch-off control signal; a detecting unit connected to the telephone line and adapted to detect a loop current from the telephone line; a storage unit adapted to store a value of the loop current detected from the detecting unit as a one-channel value when the speech channel is initially established between the telephone line and the selected one of the communication appliances, and a control unit adapted to generate the switch-on control signal to the hook switching unit in response to an incoming call, and to generate the switch-off control signal to the hook switching unit for switching a call conversation to another communication appliance connected in parallel to the telephone line when the value of the loop current output from the detecting unit is lower than the one-channel value while the selected one of the communication appliances is playing back a recorded message to the telephone line in an automatic telephone answering mode.

In accordance with another aspect, the present invention provides a method for recognizing establishment of speech channels in a plurality of communication appliances connected in parallel to a single telephone line, each communication appliance including a hook switching unit for establishing a speech channel between the telephone line and the communication appliance in accordance with a switch-on control signal and cutting off the established speech channel in accordance with a switch-off control signal, a detecting unit for detecting a loop current from the telephone line and converting a detected loop current value into a voltage value, a storage unit for storing the voltage value as a telephone line voltage, and a control unit for generating one of the switch-on control signal and the switch-off control signal. The method includes detecting a ring signal from the telephone line, and sending the switch-on control signal to the hook switching unit to thereby establish a speech channel in a corresponding communication appliance; storing, as a one-channel voltage, the telephone line voltage output from the detecting unit in the storage unit when the speech channel is initially established in the corresponding communication appliance; after the one-channel voltage is stored in the storage unit, comparing the telephone line voltage output from the detecting unit with the one-channel voltage, and determining whether an outgoing message is being output when the telephone line voltage is lower than the one-channel voltage; and when the outgoing message is being output when the telephone line voltage is lower than the one-channel voltage, terminating the outputting of the outgoing message, and sending the switch-off control signal to the hook switching unit to thereby switch call conversation to another communication appliance.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
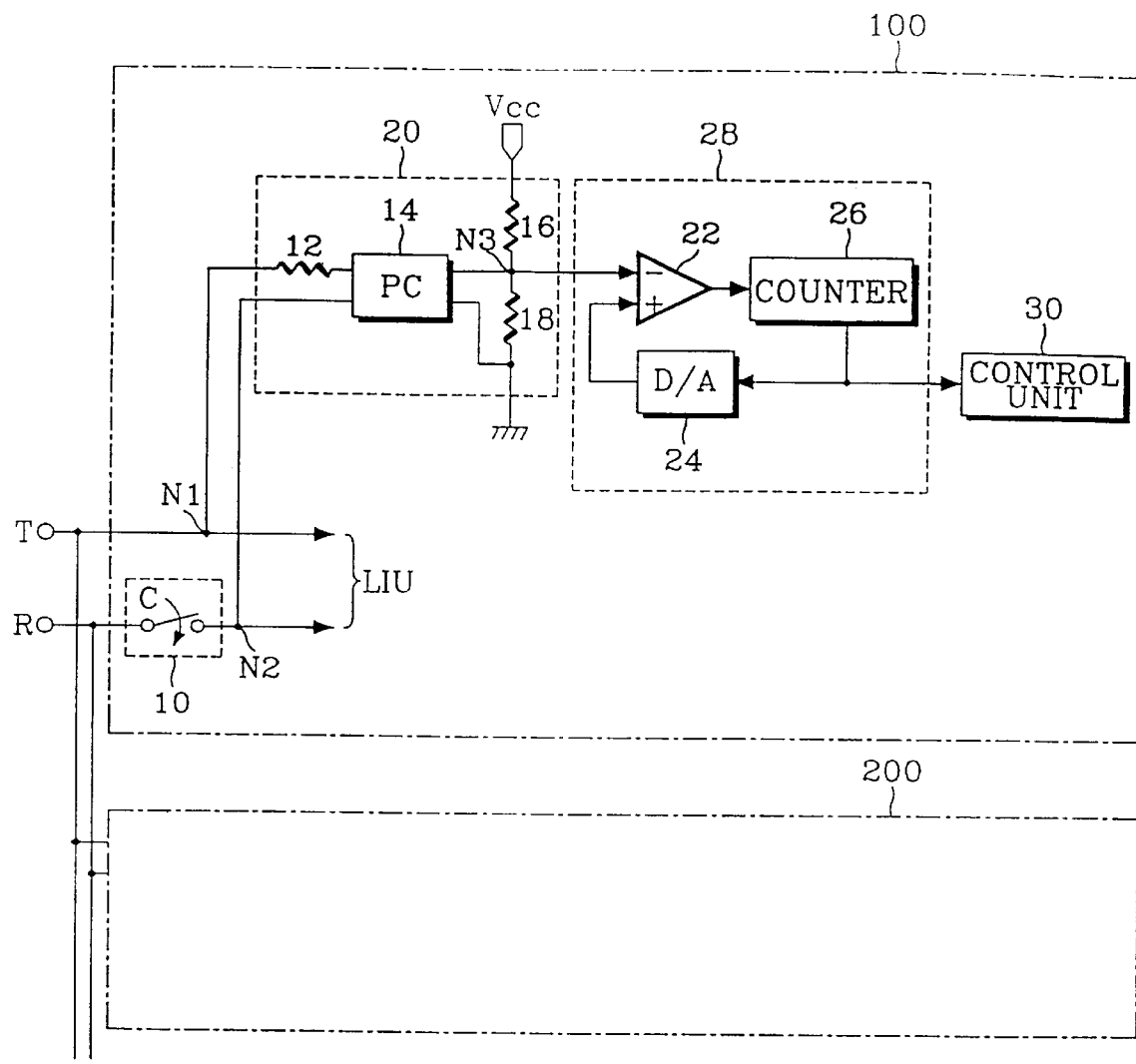
FIG. 1 is a circuit diagram of an apparatus for recognizing establishment of speech channels in communication appliances connected in parallel to a common telephone line in accordance with a preferred embodiment of the present invention.

Referring now to the drawings and particularly to FIG. 1, which illustrates an apparatus for recognizing the establishment of speech channels in each communication appliances connected in parallel to a common telephone line in accordance with a preferred embodiment of the present invention. As shown in FIG. 1, a pair of communication appliances 100 and 200 are connected in parallel to a single telephone line at tip and ring terminals T and R. Each of the communication appliances 100 and 200 is equipped with the same apparatus for recognizing the establishment of a speech channel, respectively. Accordingly, the following description will be made only in conjunction with the configuration of the first communication appliance. A hook switching unit 10 is coupled to the ring terminal R, and operates to switch on or off under control of a control unit 30. A line interface unit LIU and a voltage converter unit 20 are connected in parallel to the common telephone line at nodes N1 and N2. The first node N1 is coupled to the tip terminal T whereas the second node N2 is coupled to the ring terminal R via the hook switching unit 10. The line interface unit LIU serves to interface data from the telephone line.

The voltage converter unit 20 receives loop current at the nodes N1 and N2 and converts the received loop current into a voltage. The voltage converter unit 20 includes a resistor 12 coupled to the node N1, a photo-coupler (PC) 14 coupled to both the resistor 12 and node N2, and a pair of resistors 16 and 18 coupled in serial between a supply voltage source Vcc and the ground. The resistor 12 serves to adjust the amount of loop current flowing through the photo-coupler 14. The resistor 12 also affects the DC and impedance characteristics of the communication appliance. The photo-coupler 14 converts the amount of current flowing through the resistor 12 into a voltage value. This voltage value is proportional to the amount of current at the input stage of the photo-coupler 14. The resistors 16 and 18 receive a supply voltage from the supply voltage source Vcc in order to control the maximum and minimum voltage values and linearity of the photo-coupler 14. The resistors 16 and 18 are coupled to each other at a third node N3. The voltage value at the node N3 is inversely proportional to the output voltage value of the photo-coupler 14. In other words, the voltage value at the node N3 increases as the loop current decreases in amount.

A storage unit 28 is coupled to the third node N3 so as to receive and store the voltage applied to the node N3. The storage unit 28 includes a comparator 22 coupled to the node N3 at its one input terminal, a digital-to-analog (D/A) converter 24 coupled to the other input terminal of the comparator 22 at its output terminal, and a counter 26 coupled at its input terminal to the output terminal of the comparator 22 and at its output terminal to the input terminal of the D/A converter 24. The comparator 22 serves to compare a counted value from the counter 26, which is analog-converted by the D/A converter 24, with the voltage value at the node N3 in order to produce a comparison result in a form of a positive or negative value. The counter 26 increments its counted value when the output from the comparator 22 has a positive value while decrementing its counted value when the output from the comparator 22 has a negative value. The increment and decrement of the counted value by the counter 26 are continued until a voltage value equal to the output voltage value from the photo-coupler 14 is obtained. That is, the comparator 22 outputs a positive value when it determines that the analog value of the output from the counter 28 is higher than the voltage value at the node N3, thereby causing the counter 26 to increment its counted value. On the other hand, when the voltage value at the node N3 is lower than the analog value of the output from the counter 28, the comparator 22 outputs a negative value, thereby causing the counter 26 to decrement its counted value.

The output from the counter 26 is also applied to the control unit 30. The control unit 30 compares the received value with a one-channel voltage previously stored upon the establishment of an initial speech channel in the communication appliance. The "one-channel voltage" as described herein represents a voltage value based on initial loop current generated when one of communication appliances connected in parallel to a single telephone line initially establishes a speech channel. The one-channel voltage is a counted value output from the counter 26 when a speech channel is initially established. When the output from the counter 26 is higher than the one-channel voltage, the control unit 30 determines the establishment of another speech channel in one of other standby communication appliances. This determination is based on the fact that the output of the counter 26 higher than the one-channel voltage results from a decrease in loop current on the telephone line caused by the establishment of another speech channel. Thus, it is possible to recognize the establishment of another speech channel in the standby communication appliance site.

Figure 2:
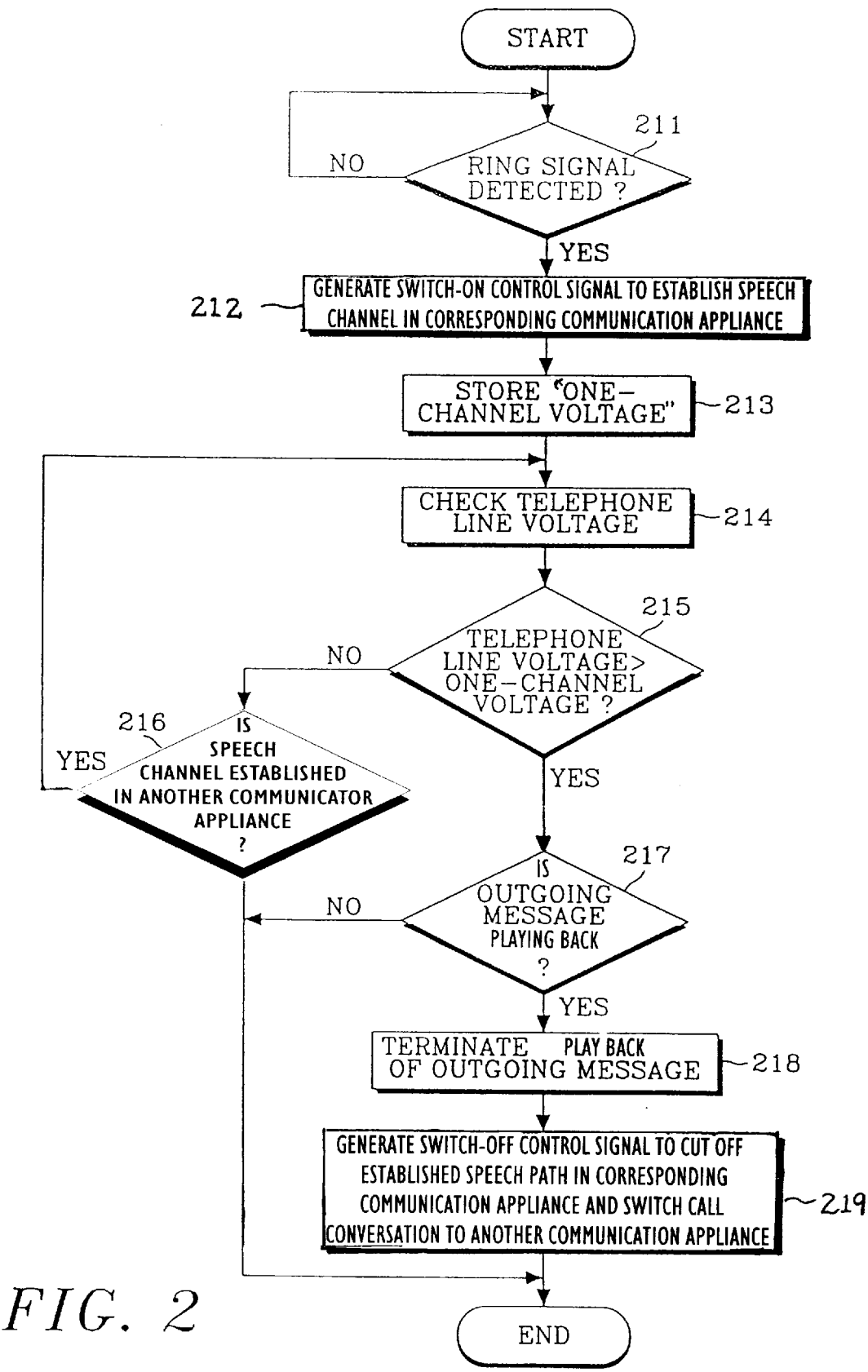
FIG. 2 is a flowchart of a process of recognizing establishment of speech channels in communication appliances connected in parallel to a common telephone line in accordance with a preferred embodiment of the present invention.

FIG. 2 is a flowchart of a process of recognizing establishment of speech channels in communication appliances connected in parallel to a common telephone line in accordance with a preferred embodiment of the present invention. The speech channel establishment process according to the present invention will now be described with reference to FIG. 1 hereinbelow.

First, it is assumed that an initial speech channel is established by the first communication appliance 100. It is also assumed that the first communication appliance 100 is a facsimile machine which is currently set to an automatic telephone answering mode.

When the first communication appliance 110 detects a ring signal from a public telephone network by its ring detecting unit (not shown) at step 211, its control unit 30 identifies the telephone answering mode of the first communication appliance 100, and generates a switch-on control signal to the hook switching unit 10. As a result, the photo-coupler 14 receives the loop current from the telephone line and converts the loop current into a voltage. The voltage output from the photo-coupler 14 is applied to the comparator 22 which, in turn, compares the voltage with an analog value which is output from the counter 26 via the D/A converter 24 prior to the establishment of a speech channel. The comparator 22 then applies its output to the counter 26. The counter 26 continuously executes its counting operation until its counted value is equal to the output voltage value of the photo-coupler 14. When the counted value of the counter 26 reaches the voltage value based on the loop current from the telephone line, the counter 26 sends this counted value to the control unit 30. This counted value represents a one-channel voltage value. The control unit 30 stores the one-channel voltage value in its desired memory area at step 213. Under this condition, the control unit 30 can check a telephone line voltage, which corresponds to the voltage exerted on the node N3 based on the loop current from the telephone line, on the basis of the counted value of the counter 26. At step 215, the control unit 30 compares the telephone line voltage with the stored one-channel voltage. If the telephone line voltage is not greater than the one-channel voltage at step 215, the control unit 30 determines the establishment of another speech channel in the other communication appliance site. In this case, the control unit 30 returns to step 214 to check the telephone line voltage. If the telephone line voltage is greater than the one-channel voltage at step 215, however, the control unit 30 recognizes that the loop current on the telephone line has varied.

Under the condition in which an initial speech loop has been established by one of parallel-connected communication appliances, a decrease in loop current occurs when another speech loop is established by one of the remaining communication appliances. In such situation, the telephone line voltage increases which is the voltage value at the node N3 based on the output value from the photo-coupler 14. Due to the increased telephone line voltage, the counted value of the counter 26 also varies. Accordingly, the control unit 30 can recognize the establishment of another speech channel in the other communication appliance site by checking the output value from the counter 26.

Subsequently, the control unit 30 checks at step 217 whether or not the communication appliance 100 plays back an outgoing message. In this situation, the communication appliance 100 is playing back an outgoing message because it is set in the automatic telephone answering mode. Accordingly, the control unit 30 terminates the playing back of the outgoing message at step 218. At step 219, the control unit 30 also sends a switch-off control signal to the hook switching unit 10, thereby cutting off the speech channel established in the communication appliance 100. Accordingly, the call conversation right is switched to the other communication appliance site at which a speech channel has been established.

As apparent from the foregoing description, the present invention utilizes the fact that in the case wherein a plurality of communication appliances are connected in parallel to a single telephone line, the loop current on the telephone line decreases in proportion to the number of channel-established communication appliances in use. That is, in accordance with the present invention, the communication appliance, in which an initial speech channel is established, detects the loop current on the telephone line. When the communication appliance detects a decrease in loop current while playing back an outgoing message, the communication appliance terminates the playing back of the outgoing message and switches the call conversation to the other communication appliance site.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. For example, while the present invention is described in the case when the first communication appliance 100 is a facsimile machine, it can be also applied to the case when the first communication appliance 100 is a telephone set. In the latter case, the control unit 30 generates a dial ring in response to a ring signal from the telephone line. After a predetermined time elapses, the control unit 30 automatically outputs an outgoing message. The control unit 30 checks telephone line voltage while outputting the outgoing message and compares the telephone line voltage with a one-channel voltage, thereby determining whether or not the call conversation right is to be switched. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus for recognizing establishment of speech channels in communication appliances connected in parallel to a single telephone line, comprising:

a hook switching unit for establishing a speech channel between the telephone line and a selected one of the communication appliances in accordance with a switch-on control signal, and for cutting off the established speech channel in accordance with a switch-off control signal;

a detecting unit connected to the telephone line and adapted to detect a loop current from the telephone line;

a storage unit adapted to store a value of the loop current detected from the detecting unit as a one-channel value when the speech channel is initially established between the telephone line and the selected one of the communication appliances; and a control unit adapted to generate the switch-on control signal to the hook switching unit in response to an incoming call, and to generate the switch-off control signal to the hook switching unit for switching a call conversation to another communication appliance connected in parallel to the telephone line when the value of the loop current output from the detecting unit is lower than the one-channel value while the selected one of the communication appliances is playing back a recorded message to the telephone line in an automatic telephone answering mode.

2. The apparatus of claim 1, further comprised of said selected one of the communication appliances corresponding a facsimile system having an answering machine incorporated therein, and said another communication appliance corresponding to a telephone set connected in parallel to the common telephone line.

3. The apparatus of claim 1, further comprised of said detecting unit comprising a voltage converter for detecting the loop current from the telephone line and converting a detected loop current value into an output voltage which represents either the value of the loop current as said one-channel value when the speech channel is initially established between the telephone line and the selected one of the communication appliances voltage, or the value of the loop current from the telephone line detected subsequent to the initial establishment of the speech path between the telephone line and the selected one of the communication appliances.

4. The apparatus of claim 3, further comprised of said storage unit comprising:

a comparator for comparing the output voltage from the voltage converter with an analog signal received therein, and producing therefrom a positive value when the output voltage from the voltage converter is higher than the analog signal while producing a negative value when the output voltage from the voltage converter is lower than the analog signal;

a counter for incrementing its counted value in accordance with the positive value output from the comparator while decrementing the counted value in accordance with the negative value output from the comparator; and a digital-to-analog converter for converting an output from the counter into the analog signal.

5. A method for recognizing establishment of speech channels in a plurality of communication appliances connected in parallel to a single telephone line, comprising the steps of:

detecting a ring signal from the telephone line, and generating a switch-on control signal to establish a speech channel in a corresponding communication appliance, each communication appliance including a hook switching unit for establishing the speech channel between the telephone line and the communication appliance in accordance with the switch-on control signal and cutting off the established speech channel in accordance with a switch-off control signal, a detecting unit for detecting a loop current from the telephone line and converting a detected loop current value into a voltage value, a storage unit for storing the voltage value as a telephone line voltage, and a control unit for generating one of the switch-on and the switch-off control signal;

storing, as a one-channel voltage, the telephone line voltage output from said detecting unit in said storage unit when the speech channel is initially established in the corresponding communication appliance; and subsequently comparing the telephone line voltage output from said detecting unit with the one-channel voltage to recognize the establishment of another speech channel at the other standby communication appliance when the telephone line voltage output from said detecting unit is lower than the one-channel voltage.

6. The method of claim 5, further comprised of said corresponding communication appliance corresponding a facsimile system having an answering machine incorporated therein, and said standby communication appliance corresponding to a telephone set connected in parallel to the common telephone line.

7. A method for recognizing establishment of speech channels in a plurality of communication appliances connected in parallel to a single telephone line, each communication appliance including a hook switching unit for establishing a speech channel between the telephone line and the communication appliance in accordance with a switch-on control signal and cutting off the established speech channel in accordance with a switch-off control signal, a detecting unit for detecting a loop current from the telephone line and converting a detected loop current value into a voltage value, a storage unit for storing the voltage value as a telephone line voltage, and a control unit for generating one of the switch-on control signal and the switch-off control signal, said method comprising the steps of:

detecting a ring signal from the telephone line, and sending the switch-on control signal to the hook switching unit to thereby establish a speech channel in a corresponding communication appliance;

storing, as a one-channel voltage, the telephone line voltage output from said detecting unit in said storage unit when the speech channel is initially established in the corresponding communication appliance;

after said one-channel voltage is stored in said storage unit, comparing the telephone line voltage output from said detecting unit with the one-channel voltage, and determining whether an outgoing message is being output when the telephone line voltage is lower than the one-channel voltage; and when the outgoing message is being output when the telephone line voltage is lower than the one-channel voltage, terminating the outputting of the outgoing message, and sending the switch-off control signal to the hook switching unit to thereby switch a call conversion to another communication appliance.

8. The method of claim 7, further comprised of said corresponding communication appliance corresponding a facsimile system having an answering machine incorporated therein, and said another communication appliance corresponding to a telephone set connected in parallel to the common telephone line.

9. A method for recognizing the establishment of speech channels in a plurality of communication appliances connected in parallel to a single telephone line, each communication appliance including a hook switching unit for establishing a speech channel between the telephone line and the communication appliance in accordance with a switch-on control signal and cutting off the established speech channel in accordance with a switch-off control signal, a detecting unit for detecting a loop current from the telephone line and converting a detected loop current value into a voltage value, a storage unit for storing the voltage value as a telephone line voltage, and a control unit for generating one of the switch-on and the switch-off control signal, said method comprising the steps of:

detecting a ring signal from the telephone line, and generating a dial ring in response to detection of the ring signal;

generating the switch-on control signal after a predetermined time elapses from the generation of the dial ring to thereby establish a speech channel in a corresponding communication appliance;

storing, as a one-channel voltage, the telephone line voltage output from said detecting unit in said storage unit when the speech channel is initially established in the corresponding communication appliance;

after said one-channel voltage is stored in said storage unit, comparing the telephone line voltage output from the detecting unit with the one-channel voltage, and determining whether an outgoing message is being output when the telephone line voltage is lower than the one-channel voltage;

when the outgoing message is being output when the telephone line voltage is lower than the one-channel voltage, terminating the outputting of the outgoing message, and sending the switch-off control signal to the hook switching unit to thereby switch a call conversion to another communication appliance.

10. The method of claim 9, further comprised of said corresponding communication appliance corresponding a facsimile system having an answering machine incorporated therein, and said another communication appliance corresponding to a telephone set connected in parallel to the common telephone line.

* * * * *